(No Model.) 6 Sheets—Sheet 1.

R. FARIES.
MACHINE FOR MAKING CHECK ROW WIRE.

No. 603,134. Patented Apr. 26, 1898.

ATTEST
Nora Graham
Ina Graham

INVENTOR.
ROBERT FARIES
by L. P. Graham
his attorney.

(No Model.) 6 Sheets—Sheet 2.

R. FARIES.
MACHINE FOR MAKING CHECK ROW WIRE.

No. 603,134. Patented Apr. 26, 1898.

ATTEST
Nora Graham
Ina Graham

INVENTOR
ROBERT FARIES
by L. P. Graham
his attorney (No Model.) 6 Sheets—Sheet 5.
R. FARIES.
MACHINE FOR MAKING CHECK ROW WIRE.

No. 603,134. Patented Apr. 26, 1898.

ATTEST
Ima Graham
Nora Graham

INVENTOR
ROBERT FARIES
by L. P. Graham
his attorney

(No Model.) 6 Sheets—Sheet 6.

R. FARIES.
MACHINE FOR MAKING CHECK ROW WIRE.

No. 603,134. Patented Apr. 26, 1898.

ATTEST
Nora Graham.
Ina Graham.

INVENTOR
ROBERT FARIES
by L. P. Graham
his attorney

UNITED STATES PATENT OFFICE.

ROBERT FARIES, OF DECATUR, ILLINOIS, ASSIGNOR TO THE FARIES MANUFACTURING COMPANY, OF SAME PLACE.

MACHINE FOR MAKING CHECK-ROW WIRE.

SPECIFICATION forming part of Letters Patent No. 603,134, dated April 26, 1898.

Application filed June 28, 1897. Serial No. 642,606. (No model.)

*To all whom it may concern:*

Be it known that I, ROBERT FARIES, of Decatur, in the county of Macon and State of Illinois, have invented certain new and useful Improvements Relating to Machines for Making Check-Row Wire, of which the following is a specification.

This invention is designed to facilitate the manufacture of check-row wire by providing mechanical means whereby uncut wire may be fed to a check-row-wire machine, be cut therein to proper lengths, be properly disposed with relation to the mandrel thereof, and be withdrawn therefrom as completed. It is exemplified in the structure hereinafter described, and it is defined in the appended claims.

The invention is designed to be used in connection with a check-row-wire machine in which ends of sections of wire are interlooped around a mandrel by means of a twister-head in axial alinement with the mandrel, and the ends of the looped portions are coiled around the wires by coiling-heads, through the axes of which the wires extend. In such a machine the mandrel around which the interloops are formed is at right angles with the extension of the wire through the machine, and it has a feed side and a discharge side—that is to say, the wire is fed into the machine toward one side of the mandrel, its parts are conjoined around the mandrel, and it is discharged from the machine from the opposite side of the mandrel. The check-row wire made on machines of this kind consists of sections, each of which comprises a body portion extending from one knot to another, and knot-forming portions on the ends of the body. In making the check-row wire the parts to be conjoined are placed one on each side of the operative location of the mandrel, with their knot-forming portions extended in opposite directions beyond such location, the mandrel is moved to place between the wires, and the knots are formed by first looping the knot-forming portions together around the mandrel and then coiling each around its body portion. In such operation the wires extend axially through the coiling-heads in bores that are large enough to permit free passage of the wire, but not large enough to permit passage of a knot, and the coiling-head on the discharge side of the mandrel is slotted to permit the wire to be lifted out and the knot to pass over the head and drop through a side passage into the enlarged bore at the rear of the coiling-head and thus pass on as the wire is being drawn forward to the position for the formation of another knot.

Prior to this invention, though attempts have been made to cut the wire to lengths in the check-row-wire machine and draw the completed wire from the machine by power, but little success has been attained, and the actual practice has usually been to cut the wire into lengths on a separate machine, feed each length separately, and draw the completed wire from the machine by hand.

By means of this invention the wire is cut into suitable lengths in the machine, is properly disposed with relation to the mandrel, the knots are guided into the enlarged side passage and central bore of the coiling-shaft, and the completed wire is drawn from the machine, all without manipulation on the part of the attendant.

The cutting mechanism consists of a pair of shears located on the feed side of the mandrel a distance therefrom equal to the length of a knot-forming portion of a section of wire. Its operative end has motion to and from the wire, and one of its jaws moves with relation to the other. The uncut wire crosses the operative position of the mandrel, and the cutting motion of the active jaw is crosswise of the wire and substantially in a plane at right angles with the longitudinal extension of the mandrel. The active jaw has an extension along the wire and toward the mandrel, which extension engages the knot-forming end of the outgoing section, and it has an oblique groove which acts as a guide for the knot-forming end of the incoming wire, the term "outgoing" being applied to the section, one end of which has been completed and advanced beyond the mandrel. The preliminary motion of the shears opens the jaws and carries them astride the wire, the motion of the active jaw severs the wire and forces the end of the outgoing section to one side of the operative location of the mandrel, and the guide-groove in the jaw diverts the end of the incoming wire to the opposite side of the mandrel when such wire is fed into interlooping position. The shears are moved to and from their work, the active jaw is moved, and the incoming wire is advanced by mechanism, preferably cam mechanism, one form of which is hereinafter described.

The mechanism employed to guide the knots through the coiler-shaft consists of a push-arm located on the discharge side of the mandrel in position to be moved into the path of the wire, together with mechanism for moving the arm into the path of the wire while a knot is moving from the location of the mandrel to the coiling-shaft having the enlarged side passage and central bore. The arm is preferably in the form of a bell-crank lever with a roller in its wire-engaging end, and a tappet on a revolving disk is preferably employed to actuate the lever. The disk is moved simultaneously with the wire-discharging mechanism, and the respective movements are so timed that the wire will be pushed from the central bore into the enlarged side passage at the time the knot is moving away from the location of the mandrel. The coiler-head comes to rest in the same position always, and the push-arm is located on the side of the wire opposite the position the enlarged bore occupies when the coiler-head is at rest.

The operation of discharging the wire from a check-row-wire machine is intermittent, one section being discharged at each operation and a knot being made previous to each discharge movement. In the customary mode of feeding previously-cut sections into the machine with one hand and withdrawing the knotted wire with the other hand the attendant may easily place the ends to be conjoined against stops located at proper distances from the mandrel to determine the lengths of the knot-forming portions; but the rule of action of the mechanism in which this invention is embodied requires that each movement of the wire through the machine shall exactly equal the length of a completed section or joint of check-row wire. To this end the mechanism for withdrawing the wire consists of a gripper adapted to engage the wire and draw it lengthwise a distance somewhat less than the length of a "joint" of check-row wire and a tappet adapted to engage the knot last made and complete the required travel of the wire. The gripper preferably engages the last made knot but one, and its motion in connection with the wire may vary considerably; but the tappet must engage the knot last made, and while the extent of its operative travel may vary somewhat its action on the wire must always terminate at a point just one joint distant from the operative location of the mandrel. In this instance the gripper is mounted on an endless chain, one run of which is adjacent to the path of the wire, and it is made to engage the wire by guideways, between which it runs and by means of which its jaws are forced into engagement with the wire. The jaws of the gripper are automatically separable, the wire is released as soon as the guides are passed, and so the length of the guides determines the distance the wire is carried by the gripper. The tappet is also, as a matter of convenience, hinged onto the same endless chain. Its operative end is forked to straddle the wire and engage the knot. It projects stiffly from the chain while in operation, and it swings loosely from the knot when the end of its operative travel is reached. This specific mechanism, which is hereinafter described with more particularity, is typical merely of the idea of this feature of the invention. The essential thing is that a traveling gripper shall draw the knot last formed clear of the knot-forming mechanism and that a tappet shall engage such last-formed knot and move it the proper distance from the mandrel.

In the drawings forming part of this specification.

The frame 1 may be made in any desired form and manner, and it is suitably supported. A standard 2 rises from the frame 1, and it is bored vertically, as shown at $2^a$ in Figs. 8 and 9, to receive the mandrel around which the wires are interlooped or conjoined. This standard, which is a part of the knot-forming mechanism of a check-row-wire machine, is preferably supplied with upwardly-projecting studs on opposite sides of the central bore $2^a$, and it is movable axially in bearings in the frame. So far as this particular invention is concerned, however, it is a matter of no consequence in what manner the standard is constructed, and the aperture $2^a$ is of importance in this connection solely from the fact that it designates the location of the mandrel and aids in making the wire-feeding, wire-disposing, and wire-withdrawing movements intelligible.

Figures 7, 8, 9:
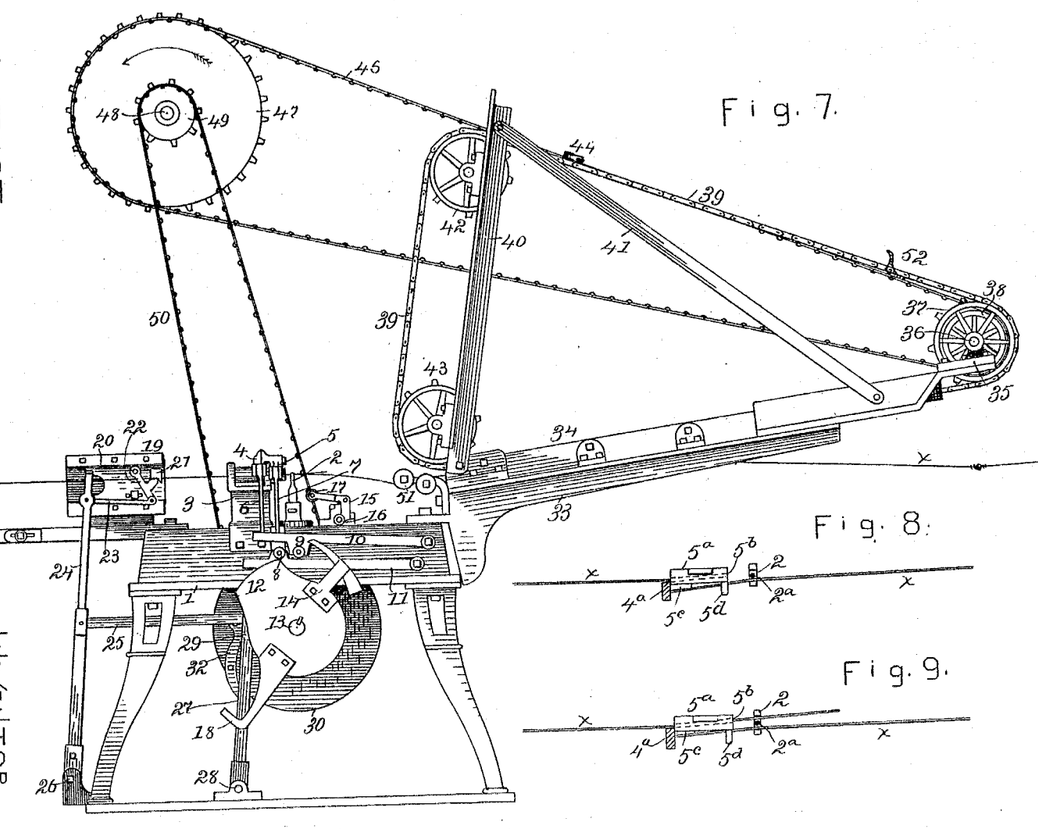
Fig. 7 shows the positions of the different parts at the time the incoming wire has been advanced past the location of the mandrel preparatory to forming a knot.
Fig. 8 is a plan of the operative portions of the jaws of the shears and the upper end of the standard, from which the mandrel extends during the knot-forming operation. This figure illustrates the action of the active jaw of the shears on the knot-forming end of the outgoing section of wire.
Fig. 9 is a plan similar to Fig. 8, which illustrates the manner in which the active jaw of the shears guides the knot-forming end of the incoming wire to a proper position relative to the operative location of the mandrel.

A bracket 3 is fastened to the frame 1 and extends above the path of the wire through the machine. In the upper end of the bracket is pivoted an arm 4 of the wire-cutting shears. The other arm 5 of the shears is pivotally connected with arm 4 at the inner ends of both arms, and the cutting-jaws of the shears extend inward and downward from the pivot of the arms. The cutting-jaw of arm 4, which is the arm farthest from the mandrel, is shown at $4^a$ in the details relating to the shears, and it has no characteristics that need special description. The jaw of arm 5 is shown at $5^a$. It is laterally elongated. It has in its end surface a groove $5^b$, which is somewhat oblique. Its cutting-blade is shown at $5^c$, and it has a projection $5^d$, which extends in the direction of its cutting motion. The elongated and grooved portion of the active jaw is back of the cutting-blade $5^c$, and in the cutting action of the shears the groove is carried in line with the end of the incoming wire, while the end of the outgoing section is turned aside by the cutting-blade and pressed against the end of the standard by projection $5^d$. (See Fig. 8.) When the incoming wire is advanced, by means to be hereinafter described, the obliquity of the groove directs the end of such wire back of the location of the mandrel, as shown in Fig. 9.

On the front of frame 1 are pivoted two bars 10 and 11, one of which connects through rod 6 with shear-arm 4, while the other connects through rod 7 with shear-arm 5. The bars have each a roller 8 and 9, and through such rollers raising and lowering action is given to the bars, the rods, and the shear-arms by means of cam members 12 and 14, one of which raises the rollers, while the other lowers them. The cam members just mentioned, as well as others to be hereinafter considered, are fastened on a shaft 13, which is journaled in bearings in frame 1 below the bed thereof. The rollers 8 and 9 rest, between cutting and guiding operations, in their lowest positions alongside one another, and in the rotation of the shaft 13 the front incline of the cam member 12 strikes roller 9 first, raising bar 10 and rod 6 and lowering the jaws of the shears to the position shown in Fig. 4. This brings the jaws astride wire $x$, which has been previously placed in the machine and prepares for the cutting operation.

Figures 1, 2:
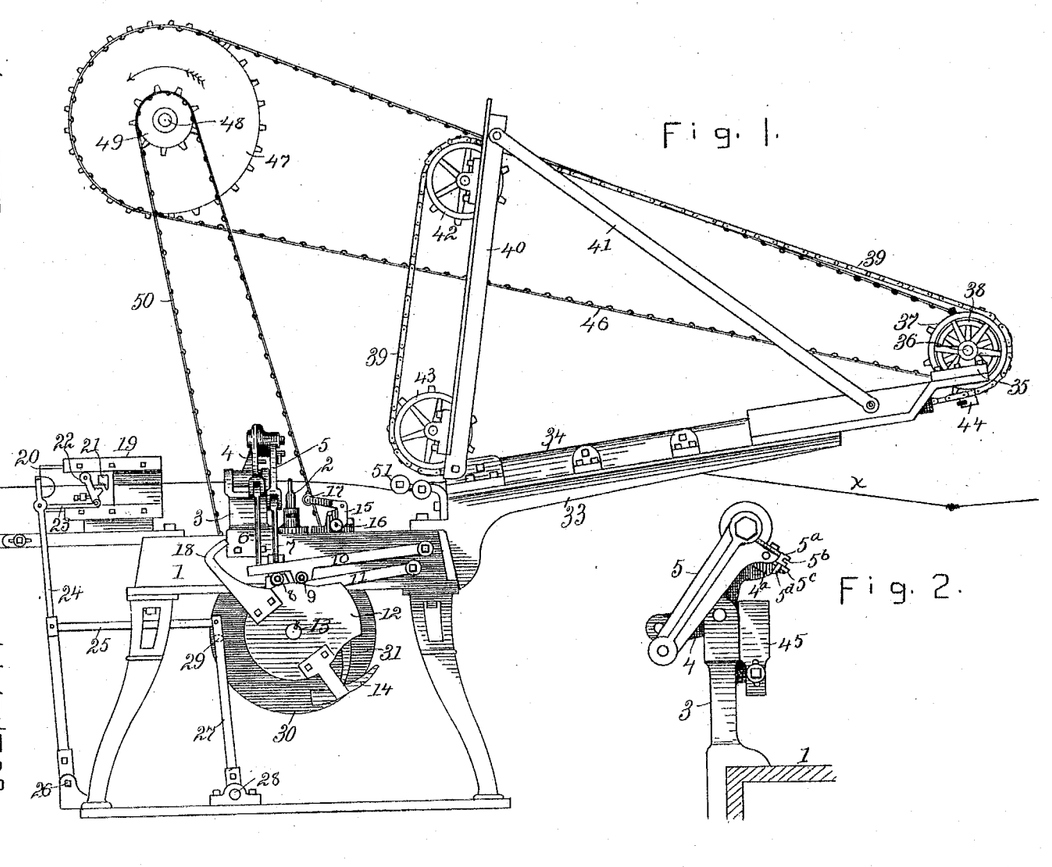
Figure 1 is a front elevation of a frame of a check-row-wire machine equipped with mechanism illustrative of my invention, the different parts being in the positions they occupy immediately preceding the act of cutting the wire.
Fig. 2 is a side view of the wire-cutting mechanism in the position it occupies when not in operation.
Figures 3, 4:
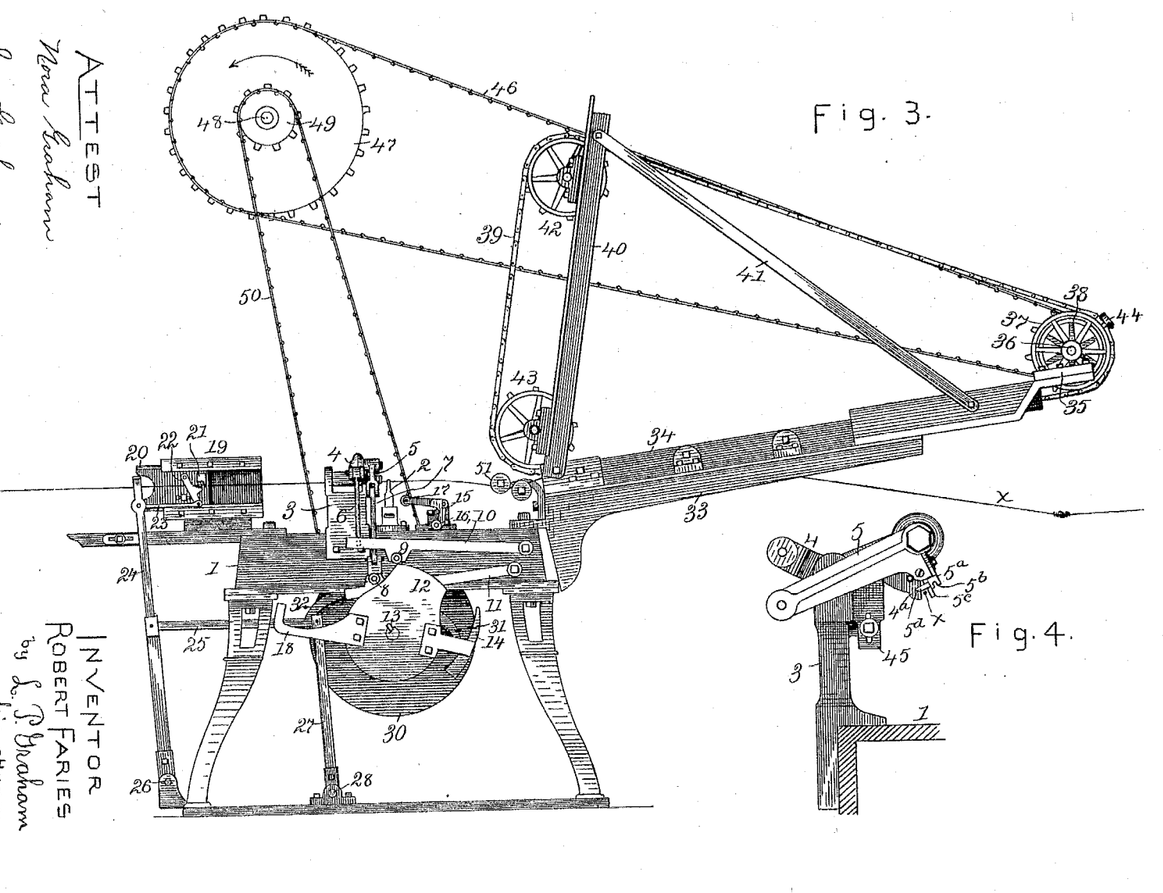
Fig. 3 is a front elevation of the embodiment of the invention, showing the cutting mechanism swung to an operative or wire-engaging position.
Fig. 4 is a side view of the wire-cutting shears, showing the jaws thereof astride the wire.
Figures 5, 6:
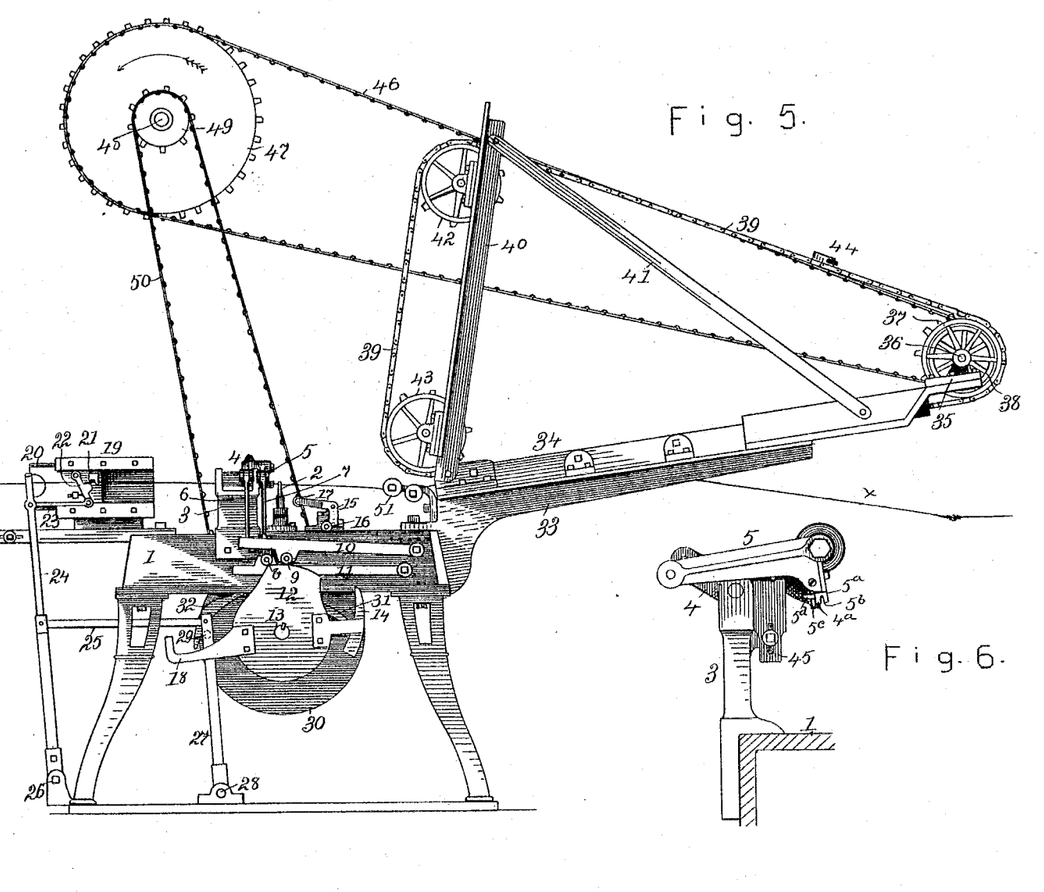
Fig. 5 shows the positions of the different parts at the time the wire is severed.
Fig. 6 is accessory to Fig. 5, and it shows the shears in side elevation at the time of completing a cut.

As soon as the jaws are lowered to position by the action of the cam on roller 9 the roller 8 is engaged, as shown in Fig. 3, and raised, as shown in Fig. 5. This raises the arm 5 of the shears, cutting the wire, pressing the knot-forming end of the outgoing section to one side, holding it against the top of the standard, and bringing the receiving end of groove $5^b$ in line with the end of the incoming wire.

Figures 12, 13, 14, 15, 16:
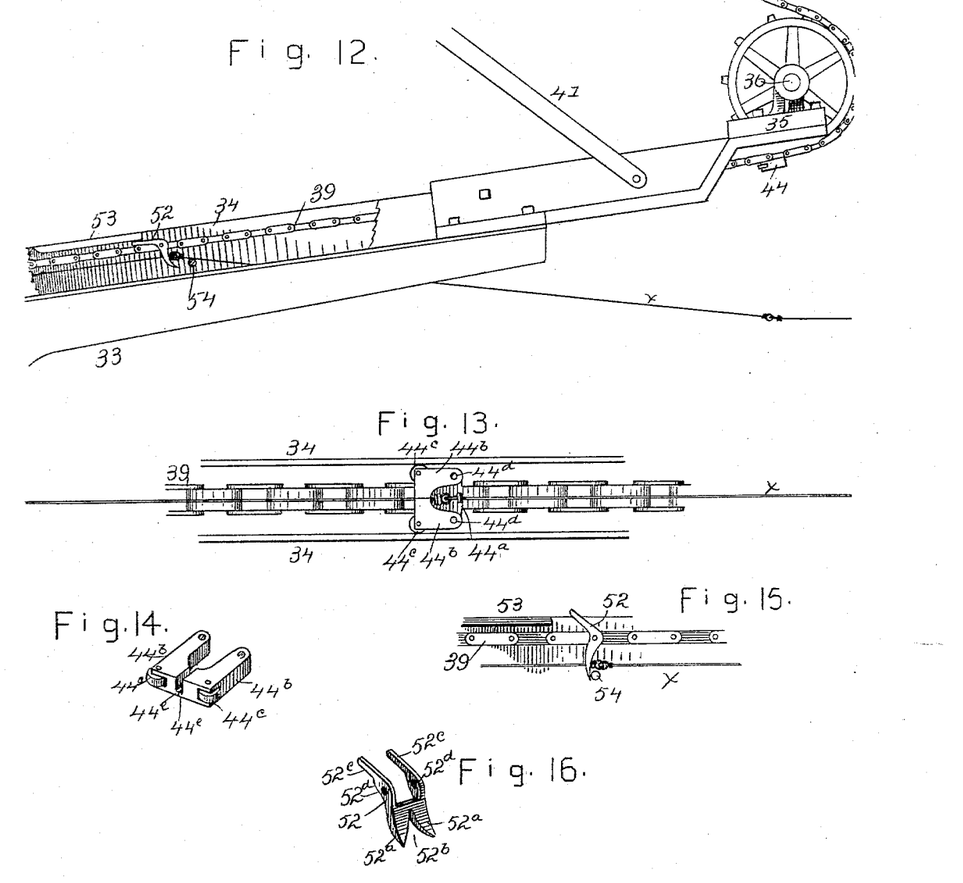
Fig. 12 is a detail illustrating the action of the tappet used to determine the length of joints.
Fig. 13 is a detail of the wire-gripper inverted, together with parts of the side bars between which the gripper runs when in operation and by means of which the gripper is made to engage the check-row wire.
Fig. 14 is a perspective view of the wire-gripper jaws detached.
Fig. 15 is a detail representing the means employed to compel the tappet to release the knot at the proper time.
Fig. 16 is a detail of the tappet in perspective.
Figure 17:
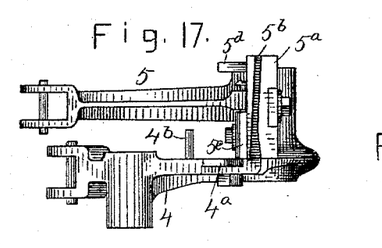
Fig. 17 is a detail showing the under surface of the shears.

The next operation is to feed the knot-forming end of the incoming wire past the location of the mandrel, and this is accomplished in this instance by mechanism as follows: A guide-frame 19 is fastened to the frame 1 on the wire-receiving side thereof, and in the guide-frame is a slide 20. A jaw 21 is fixed onto the slide, and a swinging jaw 22 is pivoted on the slide in position to coact with the fixed jaw to grip the wire. A lever 24 is pivoted at 26 on the base of frame 1, and a rod 23 connects its upper end with the swinging jaw 22 on slide 20. An arm 27 is pivoted at 28 on the base of frame 1, and its upper end has a roller 29, (shown in dotted lines,) and it connects with lever 24 by means of bar 25. A disk having cam members 31 and 32 is fixed onto shaft 13 in such position that the cam members may engage the roller 29 on arm 27. As the cutting action of the shears is completed the cam member 32 moves into contact with roller 29, as shown in Fig. 5, and further rotation of the shaft 13 causes such cam member to draw the roller toward the shaft, thereby rocking arm 27 and lever 24, forcing the swinging jaw 22 toward fixed jaw 21 in a manner to grip the wire which lies between the jaws, and carrying the slide to the position shown in Fig. 7. This advances the knot-forming end of the incoming wire beyond the location of the mandrel, as shown in Fig. 9, and through the instrumentality of the guide-groove in the shear-jaw diverts it to a position back of the location of the mandrel. While the slide is acting to feed the incoming wire to interlooping position, the cam member 12 holds the shear-jaws lowered, and as soon as such operation is completed the cam member 14 draws the bars 10 and 11 downward and raises the jaws of the shears. The knot-forming ends of the wires are then ready to be conjoined, and preparatory to such step a mandrel is inserted between the wires at the point indicated by 2ª. After this is done the wires may be interlooped around the mandrel and coiled to complete a checkrow knot by means of any known mechanism, or even without mechanism, as it is not impossible to perform this operation by hand. After the knot is completed the withdrawing mechanism operates to draw a completed joint out of the machine and leave the wire in proper position with relation to the mandrel to prepare for the formation of another knot. In this instance the wire-withdrawing mechanism consists of instrumentalities as follows: A bracket 33 is fastened to the frame 1 on the discharge side thereof. It is slotted vertically lengthwise and provided with vertical guidewalls 34, between which the lower run of an endless chain 39 extends. A frame 40 rises from the forward or receiving end of the bracket, and it is held in position by means of a brace 41. At the discharge end of the bracket 33 are placed bearings 35, in which is journaled a shaft 36. A sprocket-wheel 37 is fixed on shaft 36 in line with the slot through the bracket, and a second sprocket-wheel 38 is fixed on the shaft at the rear end thereof. A wheel 42 is journaled in bearings at the upper end of frame 40, and a wheel 43 is journaled in bearings at the receiving end of the bracket, such wheels being in vertical alinement with wheel 37 and with the slot through the bracket. A chain 39 extends around wheels 37, 42, and 43, and it is provided with a gripper 44 and a tappet 52, the details of which are as follows: The gripper comprises two jaws $44^b$, each of which has a roller $44^c$ in its swinging end. The jaws are pivoted at $44^d$ to the under side of chain 39. They extend backward with relation to the motion of the chain. Their rollers bear one against each side wall 34 of the bracket-slot when the gripper is in operative condition and each has a lip $44^e$ in Fig. 14, which lips extend beneath the wire and sustain it while it is drawn along by the movement of the chain. It is the function of the gripper to engage the last knot but one formed on the machine and withdraw the knot last formed sufficiently far to permit it to be engaged by the tappet. To effect this, it is carried downward along the approximately vertical run of the chain with its jaws open, and after it has turned under wheel 43 and straddled the wire its rollers strike the side walls of the slot and its jaws are forced, together with lips $44^e$, below the wire. The gripper is then moved along until the next to the last formed knot is encountered, (see Figs. 10 and 13,) and the wire is then drawn along until the jaws of the gripper pass beyond the guide-walls, when they open automatically or by the resistance of the knot and release the wire. The guide-walls 34 extend outward beyond the location of the second last knot formed a distance less than the length of a joint of wire, and so the wire is released before it has been carried by the gripper a distance sufficient to bring the wire in proper position with relation to the mandrel to begin the operation of forming another knot. The next step is taken by the tappet 52, which in this instance is swung on the chain 39 and is shaped somewhat as shown in Fig. 16. It comprises a body portion cut away to straddle the chain and pivoted to the chain through holes $52^d$, fingers or guide extensions $52^c$, adapted to extend rearward along the chain, and a forked extension adapted to engage the knots of the wire. The forks of the extension are shown at $52^a$ in Fig. 16 and the crotch thereof at $52^b$. Along that portion of bracket 33 in which the tappet is operative the side walls 34 are provided with ledges or guideways 53, which project inward and are located above the lower run of the chain. When the fingers $52^e$ of the tappet encounter the ledges, they swing backward and hold the forked knot-engaging end presented rigidly downward, as shown in Fig. 12. The outward terminations of the ledges determine the point at which the tappet releases the knot. In whatever position within reach of the tappet the gripper has left the knot last formed the tappet will engage it and carry it to the ends of the ledges. When the ends of the ledges are reached, the fingers are released from restraint and they swing upward, while the forked end of the tappet swings backward and releases the knot. To provide for emergencies in the wire-releasing operation of the tappet and to sustain the wire in reach of the tappet after the gripper has released it, a rod 54 is extended across the slot through the bracket 33, below the run of the chain and at the point of release of the tappet. When the wire is released by the gripper, it is still sustained by the rod within reach of the tappet, and if by any accident the tappet should fail to trip promptly after passing the ledges the rod will engage the lower end of the tappet and compel it to trip at the proper point. (See Figs. 12 and 15.)

It is desirable to use the knot last formed to determine the distance to which the wire shall be moved for the following reasons: If the last knot but one, for instance, were employed, the aggregate length of each pair of conjoined sections might approximately equal the length of every other conjoined pair; but it would be nearly impossible for the two members of each pair to be made of equal length, because if from any accident or inaccuracy of the machine or of the operator in placing the first knot in starting the machine the member upon which the gripper operated might be longer or shorter than intended, and the next succeeding member of a pair would also be of improper length, but reversely to the first member. In other words, if the first member were too short the second one would be correspondingly too long, making the variation between the two double that of the variation of each from the proper length of a member, and this diversity would be repeated in every succeeding pair until the wire should be reset or changed by some other accident or inaccuracy of the machine, whereas when the last knot formed is used to determine the draw of the wire any inaccuracy in one member will not necessarily be repeated in succeeding ones.

According to the rule of action of the machine, the chain 39 makes a complete run while the shaft 13 is making a rotation, but the means employed to drive either is immaterial. Typical driving mechanism consists of a drive-shaft 48, having sprocket-wheels 47 and 49, a chain 50, running from wheel 49 to a wheel on shaft 13, and a chain 46, running from wheel 47 to wheel 38 on shaft 36. Under this arrangement the shaft 13 turns one-half as fast as the drive-shaft, the shaft 36 turns three times as fast as the drive-shaft, and the circumference of the wheel 37 equals one-sixth of the length of chain 39. This gives the required proportionate speed to the different parts; but in practical operation it will ordinarily be found more convenient to drive shaft 13 and shaft 36 from some moving part of the knot-forming mechanism, and in that case the different movements should be so timed that the knots may be formed during the intervals between the wire cutting and feeding actions and the wire-withdrawing actions of the mechanism under consideration.

As the knots are passed from the location of the mandrel they usually move through a coiling-head and are diverted into an enlarged side bore to permit the passage to be made. Such diversion is made at the time the knot moves away from the location of the mandrel, and the mechanism employed to effect this result consists in this instance of the bell-crank lever 15, having a roller 16 on one end and a roller 17 on the other end. This bell-crank or push lever is pivoted in a bearing-block 55 (shown in Fig. 11) on a rod 58, and such block is supplied with stop projections 56 and 57, by means of which the swing of the lever is limited. A tappet 18 is fastened in any suitable manner to shaft 13, and it is so disposed with relation thereto that as the gripper begins to move the wire the tappet strikes roller 16, forces roller 17 against the wire, and diverts the wire in the proper direction for the knot to pass over the coiling-head and through the wheel, as shown in Fig. 10.

The guide-rollers 51 are introduced to aid in guiding the wire within reach of the gripper and the tappet.

In the preceding description the gripper and the tappet are both fastened to the chain and move continuously; but it will be understood that while it is essential that the gripper shall move the wire sufficiently far to enable the tappet to engage the knot last made and the tappet shall move the wire the remainder of the required distance it is somewhat immaterial by what particular means the gripper and the tappet are moved.

Figures 10, 11:
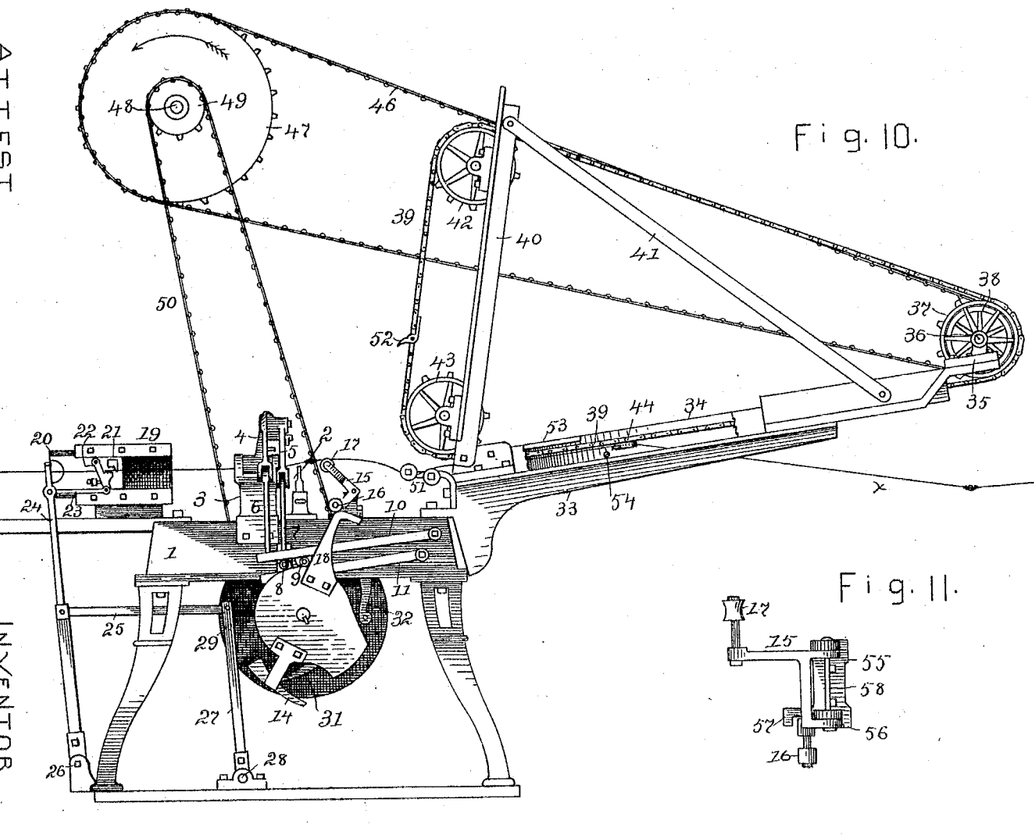
Fig. 10 shows the location of the different parts at the time the mechanism begins to draw a completed joint out of the machine.
Fig. 11 is a plan of the lever that pushes the wire into the enlarged side passage of the coiling-wheel on the discharge side of the mandrel.

The mechanism is in the foregoing description made to begin its operation with the cutting of the wire, which is the first step in the formation of a knot; but a complete continuous operation of this mechanism, considered independent of the knot-forming mechanism, begins immediately after a knot is formed and continues until two ends of wire are again presented to the knotting mechanism in proper position to be conjoined—that is to say, each continuous operation of the new mechanism begins under the conditions shown in Fig. 10 and passes successively through the stages shown in Figs. 1, 3, 5, and 7, when a pause is made in active operations to permit the knot to be formed, and the series of steps is repeated indefinitely.

What I claim as new, and desire to secure by Letters Patent, is—

1. A shears for cutting wire in a check-row-wire machine, such shears having a wire-guide on its active jaw, substantially as set forth.

2. In a machine for making check-row wire, a guide-bar adapted to be moved into and out of the path of the incoming wire, whereby the end of such wire may be guided to knotting position, substantially as set forth.

3. In a shears for cutting wire in a check-row-wire machine, an active jaw adapted to cut the wire and push one of the severed ends out of the path of the wire through the machine, substantially as set forth.

4. In a shears for cutting wire in a check-row-wire machine, an active jaw adapted to cut the wire and push one of the severed ends out of the path of the wire through the machine, and a guide-bar on such jaw adapted to be moved into the path of the wire as such severed end is pushed aside, substantially as set forth.

5. In a shears for cutting wire in a check-row-wire machine, the combination of a relatively inactive jaw adapted to be moved to and from its work and an active jaw forming a wire-guide, substantially as set forth.

6. In wire-cutting mechanism for check-row-wire machines, the combination of a passive shears-arm pivoted to swing to and from the path of the wire, an active shears-arm pivoted on the passive arm, and a cam adapted to act first on the passive arm and then on the active arm, whereby the shears may be moved to position and the wire severed by the action of the cam, substantially as set forth.

7. In wire-cutting mechanism for check-row-wire machines, the combination of a passive shears-arm pivoted to swing to and from the path of the wire, an active shears-arm pivoted on the passive arm, a pair of bars each pivoted at one end and provided with a roller at the other end, rods connecting the bars one with each shears-arm, and a cam adapted to act on the rollers successively, substantially as set forth.

8. In mechanism for cutting wire in a check-row-wire machine, the combination of a passive shears-arm pivoted to swing to and from the path of the wire, an active shears-arm pivoted on the passive arm and having a guide-groove on its jaw, a feeder to advance the wire into the machine after the cutting operation is performed, and a cam to move the passive arm to position, to move the active arm to cut the wire, and to hold the arms in the positions they occupy immediately after the wire is cut until the incoming end is fed to conjoining position through the groove in the active jaw, substantially as set forth.

9. Mechanism for feeding wire into a check-row-wire machine consisting of a slide having a fixed jaw and a swinging jaw, a rock-arm, a cam adapted to rock the arm, and a connection between the swinging jaw and the rock-arm whereby the swinging jaw may force the wire against the fixed jaw and the slide may be moved when motion is imparted to the rock-arm, substantially as set forth.

10. Mechanism for withdrawing wire from check-row-wire machines, comprising a primarily acting gripper and a secondarily acting tappet adapted to engage and adjust the knot last made, substantially as set forth.

11. Gripper-jaws for engaging knots of check-row wire, such jaws having lips adapted to extend beneath the wire, substantially as set forth.

12. Mechanism for withdrawing wire from check-row-wire machines, comprising an endless chain, a gripper on the chain adapted to give primary motion to the wire, and a tappet, also on the chain, adapted to engage the knot last formed and complete the withdrawal motion, substantially as set forth.

13. Mechanism for withdrawing wire from check-row-wire machines, consisting of an endless chain, a gripper on the chain composed of a pair of pivoted jaws, guide-walls adapted to force the jaws of the gripper together throughout a portion of the travel of the chain, whereby the wire may be carried by the gripper while the gripper is between the guide-walls, and a tappet adapted to engage the last-formed knot of the wire and complete the discharging action, substantially as set forth.

14. Mechanism for withdrawing wire from check-row-wire machines, consisting of an endless chain, a gripper on the chain composed of a pair of pivoted jaws, guide-walls to hold the gripper-jaws closed throughout a portion of the run of the chain, a tappet swung loosely on the chain and provided with guide extensions, and guideways to engage the tappet extensions at a certain locality in the travel of the chain and hold the tappet rigid, substantially as set forth.

15. In mechanism for withdrawing wire from check-row-wire machines, the combination of an endless chain, a gripper on the chain, a tappet swung loosely on the chain, a guideway to hold the tappet rigid with relation to the chain throughout a portion of its travel, and a trip to throw the tappet when it passes out of the control of the guideway, substantially as set forth.

16. In mechanism for withdrawing wire from check-row-wire machines, the combination of a gripper adapted to move the wire lengthwise, and a push-lever adapted to divert the wire laterally simultaneous with the initial action of the gripper, substantially as set forth.

17. In mechanism for cutting wire in check-row-wire machines and withdrawing it therefrom, the combination of a rotary cam, an endless chain adapted to make a trip in its travel while the cam makes a rotation, wire-cutting shears adapted to be actuated by the cam, and a wire-withdrawing gripper carried by the chain, substantially as set forth.

18. In mechanism for feeding wire into a check-row-wire machine, cutting it therein, and withdrawing it therefrom, the combination of a rotary cam, an endless chain adapted to make a trip in its travel while the cam is making a rotation, wire-cutting shears, a wire-feeder, and a gripper on the chain, the connections being such that the cam moves the shears to operative position, cuts the wire and operates the feeder, in the order named, and subsequently the gripper on the chain engages the wire, substantially as set forth.

In testimony whereof I sign my name in the presence of two subscribing witnesses.

ROBT. FARIES.

Attest:
CHAS. E. DAWSON,
BALDWIN STARR.